(12) United States Patent
Fujita et al.

(10) Patent No.: US 7,976,059 B2
(45) Date of Patent: Jul. 12, 2011

(54) AIR BAG DEVICE

(75) Inventors: Keiichiro Fujita, Atsugi (JP); Tsutomu Koizumi, Atsugi (JP); Takayuki Hisajima, Atsugi (JP)

(73) Assignee: Autoliv Development AB, Vargarda (SE)

( * ) Notice: Subject to any disclaimer, the term of this patent is extended or adjusted under 35 U.S.C. 154(b) by 386 days.

(21) Appl. No.: 11/989,494

(22) PCT Filed: Jul. 24, 2006

(86) PCT No.: PCT/JP2006/315072
§ 371 (c)(1),
(2), (4) Date: Nov. 10, 2008

(87) PCT Pub. No.: WO2007/013635
PCT Pub. Date: Feb. 1, 2007

(65) Prior Publication Data
US 2010/0059973 A1 Mar. 11, 2010

(30) Foreign Application Priority Data
Jul. 28, 2005 (JP) .................................. 2005-218542

(51) Int. Cl.
*B60R 21/16* (2006.01)
(52) U.S. Cl. .................... 280/731; 200/61.54; 200/61.55
(58) Field of Classification Search .................. 280/731; 200/61.54, 61.55
See application file for complete search history.

(56) References Cited

U.S. PATENT DOCUMENTS 6,908,102 B2 * 6/2005 Sugimoto .................. 280/728.2
7,690,678 B2 * 4/2010 Fujita et al. .................... 280/731

FOREIGN PATENT DOCUMENTS

| JP | 2001-206184 A | 7/2001 |
| JP | 2001-213326 A | 8/2001 |
| JP | 2001-278066 A | 10/2001 |
| JP | 2001-354101 A | 12/2001 |
| JP | 2002-12115 A | 1/2002 |
| JP | 2002-114121 A | 4/2002 |

* cited by examiner

*Primary Examiner* — Eric Culbreth
(74) *Attorney, Agent, or Firm* — Harness, Dickey & Pierce, P.L.C.

(57) ABSTRACT

An air bag device includes a retainer to which an inflator and a folded air bag are attached. The retainer is fixed to a steering wheel armature and has a plurality of hooks formed in a side wall portion thereof. A module cover covers the air bag and each hook of the plurality of hooks is engaged with an opening of a leg piece portion projected from a rear side. The module cover can be vertically moved with respect to the retainer. A horn plate has a plurality of contacts attached along a circumferential edge of the module cover and moved integrally with the module cover at a horn operating time. A contact plate is attached to the retainer. A horn spring is arranged between the horn plate and the retainer. The contact plate includes a clip portion fastened to the retainer and a leaf spring portion abutting against one of the contacts of the horn plate at the horn operating time.

7 Claims, 5 Drawing Sheets

AIR BAG DEVICE

CROSS-REFERENCE TO RELATED APPLICATIONS

This application claims the benefit and priority of JP 2005-218542, filed 28 Jul. 2005. This application is a National Stage of International Application No. PCT/JP2006/315072, filed 24 Jul. 2006. The entire disclosures of each of the above applications are incorporated herein by reference.

FIELD

The present invention relates to an air bag device having a steering horn contact device, and particularly relates to an air bag device in which the steering horn contact device is turned on by moving only a module cover when the module cover is pushed.

BACKGROUND

For example, as an air bag device for a driver's seat arranged in a steering wheel of an automobile, FIG. 29 of Japanese Patent Laid-Open No. 2001-206184 discloses a so-called floating type air bag device in which the steering horn contact device is turned on and a horn is sounded when the module cover is pushed.

The floating type air bag device is constructed such that the entire air bag device is not operated but only the module cover is operated. Accordingly, pressing force required to turn on the steering horn contact device is reduced and a driver can sound the horn by only lightly pushing the module cover.

SUMMARY

However, in the floating type air bag device having the steering horn contact device, when the module cover and the retainer are assembled, it is necessary to engage a hook formed in a side wall portion of the retainer with an opening of a leg piece portion integrally projected on a rear face of the module cover. Therefore, it is necessary to move the retainer toward the interior of the module cover as much as possible. However, it is impossible to push in the retainer by a clearance or more between a fixing contact of the retainer side and a movable contact of the module cover side.

The present invention solves the above problem, and an object of the present invention is to provide a floating type air bag device having a steering horn contact device able to move toward the retainer by the clearance or more between the fixing contact of the retainer side and the movable contact of the module cover side.

The present teachings provide an air bag device having a retainer to which an inflator and a folded air bag are attached. The retainer is fixed to a steering wheel armature and has a plurality of hooks formed in a side wall portion thereof. A module cover covers the air bag and each of the hooks is engaged with an opening of a leg piece portion projected from a rear side. The module cover can be vertically moved with respect to the retainer. A horn plate has a plurality of contacts attached along a circumferential edge of the module cover and is moved integrally with the module cover at a horn operating time. A contact plate is attached to the retainer or the horn plate. A horn spring is arranged between the horn plate and the retainer. The contact plate includes a clip portion fastened to the retainer. A leaf spring portion abuts against a contact of the horn plate at the horn operating time.

It is preferable that an extending-out portion is arranged in the retainer or the horn plate, and the clip portion of the contact plate is formed so as to fasten the extension portion.

Since the air bag device of the present invention is constructed as mentioned above, the horn plate is assembled into the module cover and the retainer is then assembled and the contact plate can be finally assembled. Accordingly, when the module cover and the retainer are assembled, the retainer can be pushed in by the clearance d or more between the contact of the horn plate and the contact of the contact plate so that the retainer can be easily assembled.

Further, the retainer can be pushed in by the clearance d or more by forming the contact of the contact plate as a leaf spring and is easily assembled even in the air bag device of a layout in which no contact plate can be assembled after the retainer is assembled.

Further, a contact hitting sound at a horn operating time can be reduced by forming the contact of the contact plate as a leaf spring.

DRAWINGS

DETAILED DESCRIPTION

One example of an embodiment of the present invention will be explained in detail with reference to the drawings.

Figure 1:
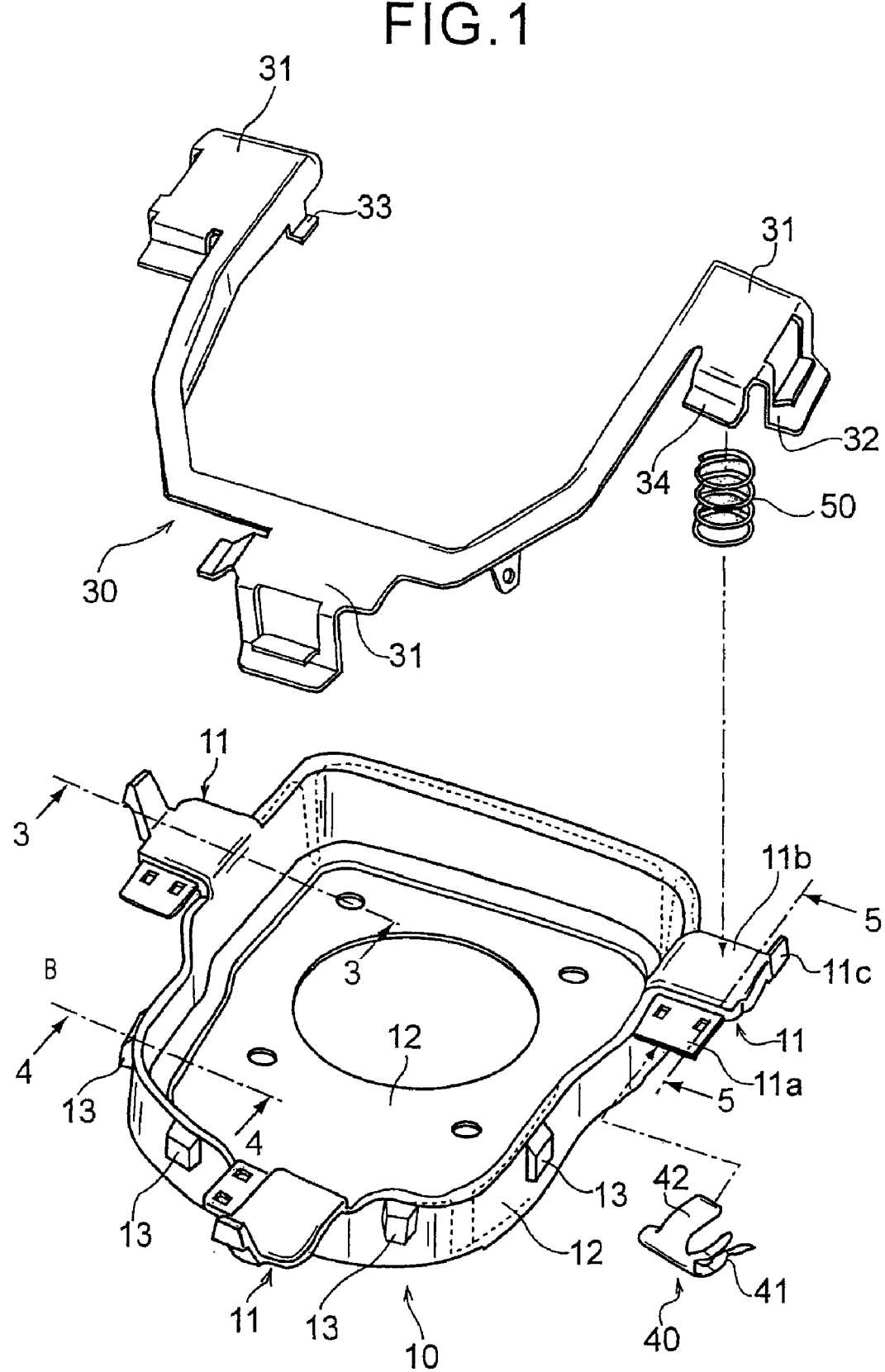
FIG. 1 is a perspective view showing the relation of a horn plate and a retainer of an air bag device in accordance with an embodiment of the present invention.
Figure 2:
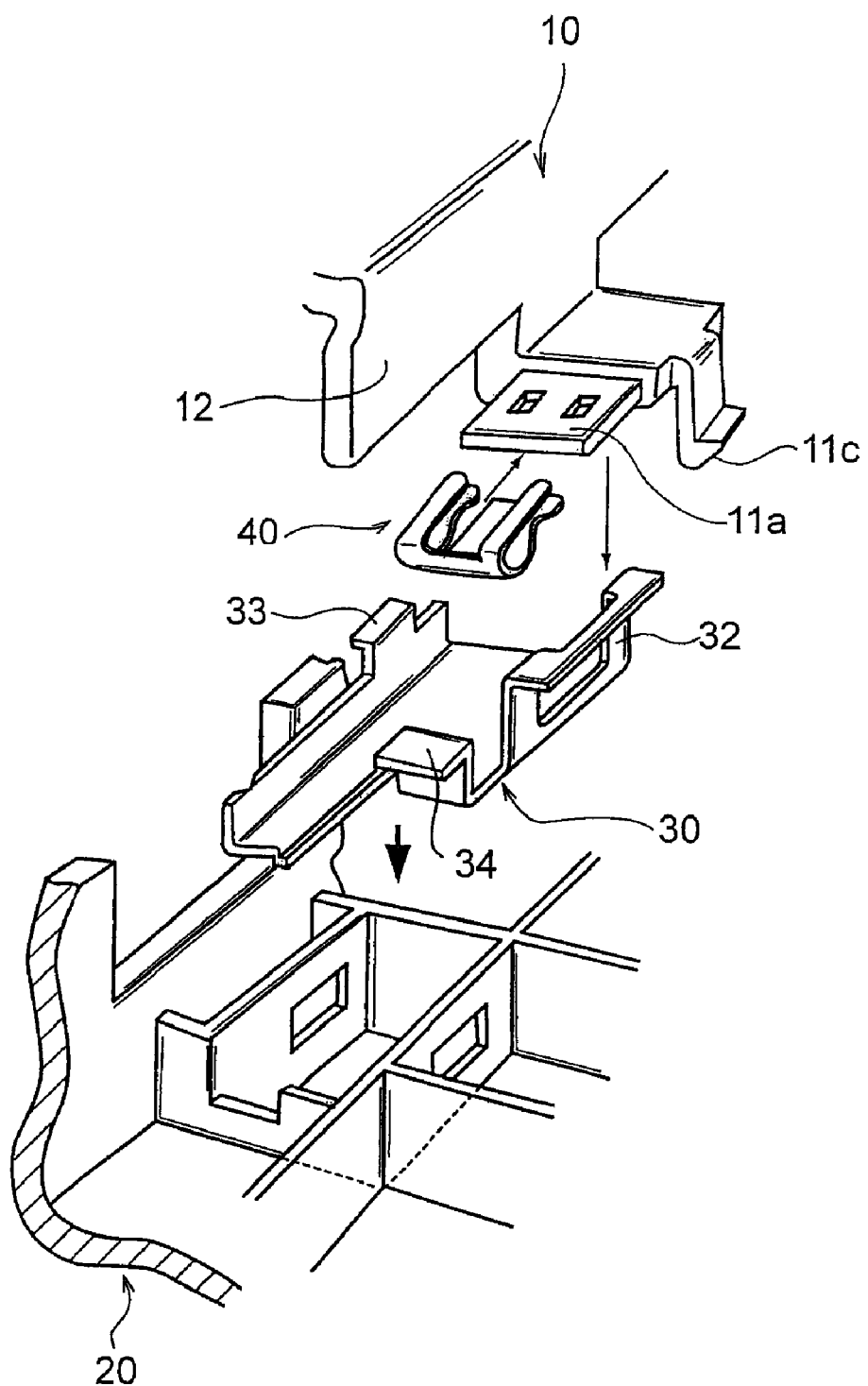
FIG. 2 is a perspective view of a main portion for explaining an assembly procedure of the air bag device of FIG. 1.
Figure 3:
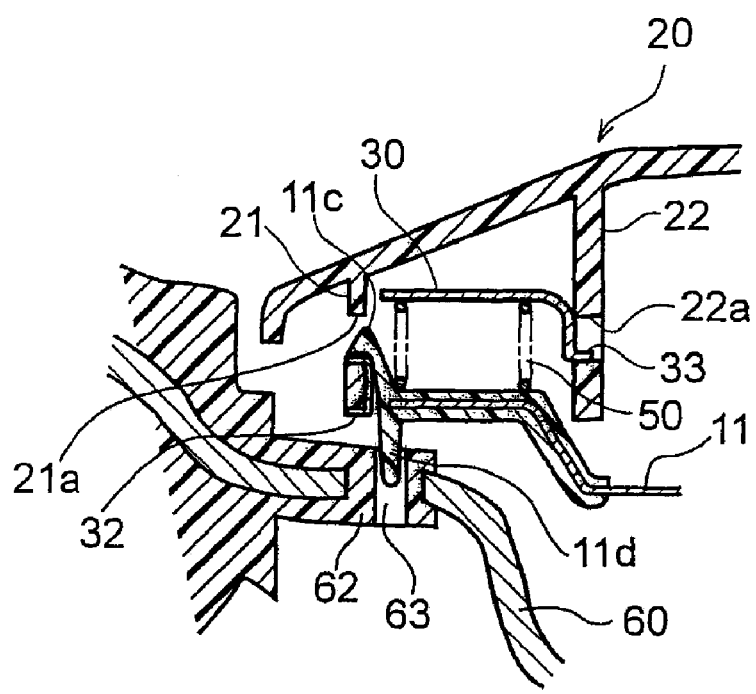
FIG. 3 is a sectional view taken along the line 3-3 of FIG. 1.
Figure 4:
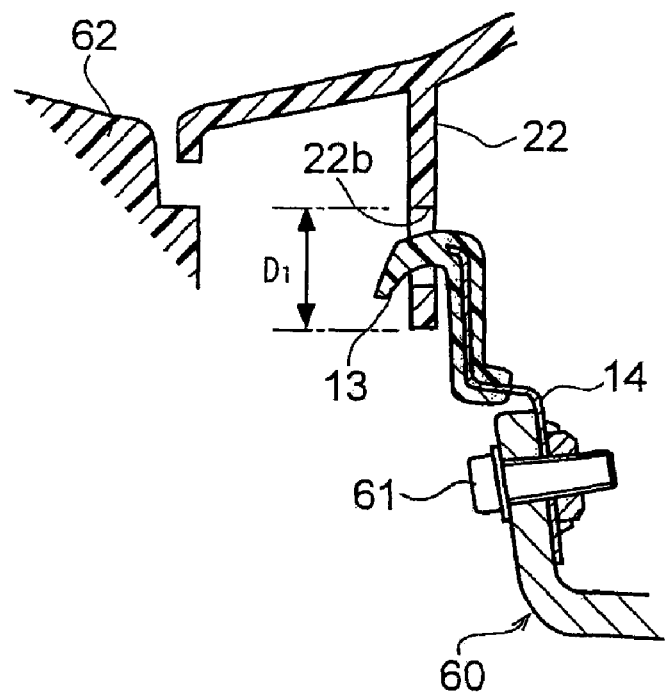
FIG. 4 is a sectional view taken along the line 4-4 of FIG. 1.
Figure 5:
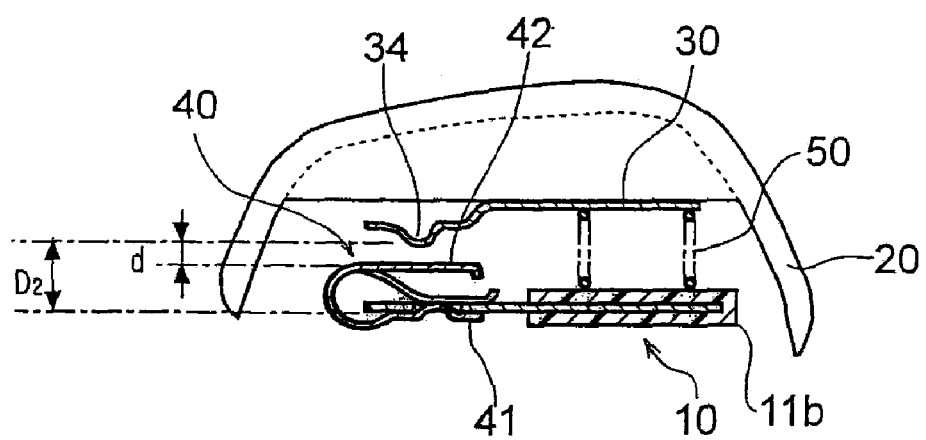
FIG. 5 is a sectional view taken along the line 5-5 of FIG. 1.

FIG. 1 is a perspective view showing the relation of a horn plate and a retainer of an air bag device in accordance with an embodiment of the present invention. FIG. 2 is a perspective view of a main portion for explaining an assembly procedure of the air bag device of FIG. 1. FIG. 3 is a sectional view taken along the line 3-3 of FIG. 1. FIG. 4 is a sectional view taken along the line 4-4 of FIG. 1. FIG. 5 is a sectional view taken along the line 5-5 of FIG. 1.

The air bag device having a steering horn contact device is constructed by arranging a retainer 10 attaching an inflator and a folded air bag thereto, a module cover 20 covering the above air bag, a horn plate 30 attached to the module cover 20, a contact plate 40 attached to an extension portion 11 of the above retainer 10, and a horn spring 50 arranged between the horn plate 30 and the extension portion 11 of the above retainer 10.

An outside leg piece portion 21 and an inside leg piece portion 22 are projected from a rear face of the module cover 20. Further, the horn plate 30 approximately has a U-shape seen from a plane, and contact portions 31 with the contact plate 40 are formed in three places.

The contact portion 31 has an outside fitting piece 32 fitted to an opening 21a of the outside leg piece portion 21 and a contact 34 abutting on the contact plate 40. An inside bending piece 33 may be arranged in the contact portion 31 of the horn plate 30, and may be also engaged with an opening 22a of the inside leg piece portion 22 of the module cover 20 as one example of a means for fixing the horn plate 30 to the module cover 20. Further, a rib thin in wall thickness may be arranged in a part of the module cover 20 abutting on the horn plate 30 and may be also engaged so as to push in the horn plate 30 although this rib is not particularly illustrated in the drawings.

The horn plate 30 is attached along a circumferential edge of the module cover 20, and the outside fitting piece 32 approximately formed in the U-shape in section is fitted to the opening 21a of the outside leg piece portion 21 of the module cover 20. Further, the inside bending piece 33 is attached to the opening 22a of the inside leg piece portion 22. Thus, at a horn operating time, the horn plate 30 is moved integrally with the module cover 20.

The illustrated inflator and the illustrated air bag are attached to a bottom face portion 12 of the retainer 10. The contact plate 40 is fixed to the extension portion 11 formed so as to be extended out to a side wall portion 12 in three places. Further, a plurality of hooks 13 formed in the side wall portion 12 are engaged with an opening 22b of the inside leg piece portion 22. Further, a projecting piece 14 projected downward from the rear face of the retainer 10 is fixed to a steering wheel armature 60 by a bolt 61.

The above extension portion 11 is constructed by a metallic portion 11a attaching the contact plate 40 thereto, and an insulating portion 11b placing the horn spring 50 thereon. The insulating portion 11b is a portion formed by injection molding resin so as to cover a part of the above metallic portion 11a, which is formed so as to be extended out to the side wall portion 12. The insulating portion 11b is constructed by a pawl 11c abutting on the outside fitting piece 21, and a pin 11d inserted into a guide hole 63 formed in a resin coating portion 62 of the steering wheel armature 60.

The contact plate 40 is constructed by a clip portion 41 for fastening the metallic portion 11a, and a leaf spring portion 42 abutting on the contact 34 of the horn plate 30 during the horn operation. For example, the contact plate 40 is preferably manufactured by a phosphor bronze plate.

When the module cover 20 and the retainer 10 are assembled, it is necessary that the hook 13 formed in the side wall portion 12 is reliably engaged with the opening 22b of the inside leg piece portion 22. However, it is therefore necessary to push in the retainer 10 on the module cover 20 side as much as possible (pushing-in amount: D1). However, when the contact plate 40 is already fixed to the retainer 10, it is impossible to push in the retainer 10 by a clearance d (<D1) or more between the contact 34 of the horn plate 30 and the contact of the contact plate 40. This is because the contact plate 40 hits against the horn plate 30.

However, when the horn plate 30 is assembled into the module cover 20 and the retainer 10 is then assembled and the clip portion 41 of the contact plate 40 is finally fastened in the metallic portion 11a of the retainer 10 as in this embodiment, pushing in (D2≧D1) of the clearance d or more can be performed in assembling the module cover 20 and the retainer 10, and the retainer 10 is easily assembled and working efficiency is improved.

The invention claimed is:

1. An air bag device comprising:
a retainer for receiving an inflator and a folded air bag, the retainer being fixed to a steering wheel armature and having a plurality of hooks formed in a side wall portion thereof;
a module cover in which the module cover covers the air bag and each hook of the plurality of hooks is engaged with an opening of a leg piece portion projected from a rear side and the module cover can be vertically moved with respect to the retainer;
a horn plate having a plurality of contacts attached along a circumferential edge of the module cover, the horn plate integrally movable with the module cover at a horn operating time;
a plurality of contact plates attached to the retainer; and
a plurality of horn springs arranged between the horn plate and the retainer;
wherein each contact plate includes a clip portion fastened to the retainer, and a leaf spring portion abutting against one of the contacts of the horn plate at the horn operating time.

2. The air bag device according to claim 1, wherein the retainer is formed to include a plurality of extending-out portions, and the clip portion of each of the contact plates is formed so as to fasten to an associated one of the extending-out portions.

3. A subassembly for a motor vehicle steering wheel, the subassembly comprising:
a retainer for receiving a folded air bag, the retainer adapted to be fixed to an armature of the steering wheel, the retainer including a main portion and a plurality of extensions;
a module cover covering the air bag, the module cover mounted to the retainer for movement relative to the retainer;
a horn plate attached to the module cover and movable with the module cover relative to the retainer at a horn operating time, the horn plate including a main body portion and a corresponding plurality of contacts outwardly extending from the main body portion; and
a corresponding plurality of contact elements, each contact element including a clip portion secured to a respective extension of the plurality of extensions and adapted to contact a respective contact of the plurality of contacts at the horn operating time.

4. The subassembly according to claim 3, wherein each contact element includes a leaf spring portion abutting the respective contact at the horn operating time.

5. The subassembly according to claim 3, wherein the module cover includes at least a first leg extending toward the retainer and the horn plate includes at least a flange received within a first slot of the first leg.

6. The subassembly according to claim 5, wherein the module cover further includes at least a second leg extending toward the retainer, the second leg defining a second slot and a pawl of the retainer is received in the second slot.

7. The subassembly according to claim 3, wherein each contact element includes a leaf spring portion.

* * * * *